(12) United States Patent
Bertin et al.

(10) Patent No.: US 6,451,911 B1
(45) Date of Patent: *Sep. 17, 2002

(54) COMPOSITION BASED ON AN ETHYLENE-VINYL ALCOHOL COPOLYMER AND ITS USE

(75) Inventors: Denis Bertin, Motteville; Denis Germain, Serquigny; Patrice Robert, Beaumont Le Roger, all of (FR)

(73) Assignee: Atofina, Puteaux (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/487,205

(22) Filed: Jan. 19, 2000

(30) Foreign Application Priority Data

Jan. 19, 1999 (FR) ............................................. 99/00491

(51) Int. Cl.$^7$ ................................................ C08L 77/00
(52) U.S. Cl. ............................. 525/63; 525/66; 525/69; 525/179
(58) Field of Search .............................. 525/179, 63, 69

(56) References Cited

U.S. PATENT DOCUMENTS

| | | | |
|---|---|---|---|
| 5,160,475 A | 11/1992 | Asano et al. ........... 264/331.17 |
| 5,177,138 A | 1/1993 | Moriyama et al. .......... 524/437 |
| 5,214,090 A | 5/1993 | Moriyama et al. .......... 524/424 |
| 5,280,065 A | 1/1994 | Moriyama et al. ............. 525/57 |
| 5,298,334 A | 3/1994 | Moriyama et al. ....... 428/474.4 |
| 5,310,788 A | 5/1994 | Moriyama et al. ............. 525/57 |
| 5,338,502 A | 8/1994 | Moriyama et al. .......... 264/322 |
| 5,489,478 A | 2/1996 | Audry et al. ................ 428/412 |

FOREIGN PATENT DOCUMENTS

| | | |
|---|---|---|
| EP | 0 441 666 | 1/1991 |
| EP | 0440535 | 8/1991 |
| EP | 0440557 | 8/1991 |
| EP | 0440558 | 8/1991 |
| EP | 0440560 | 8/1991 |
| EP | 0444977 | 9/1991 |
| EP | 0483695 | 5/1992 |
| FR | 2677988 | 12/1992 |

*Primary Examiner*—Ana Woodward
(74) *Attorney, Agent, or Firm*—Millen, White, Zelano & Branigan, P.C.

(57) ABSTRACT

The invention relates to a composition based on an ethylene-vinyl alcohol copolymer comprising:

50 to 98% by weight of an EVOH copolymer
  1 to 50% by weight of a polyethylene (A)
  1 to 15% by weight of a polymer (B) resulting from the reaction (i) of a copolymer (B1) of ethylene and of an unsaturated monomer X grafted or copolymerized with (ii) a polyamide (B2). It also relates to a multilayer structure comprising a layer consisting of this composition. This structure is useful for making packaging. The composition of the invention also adheres well to PET, this property being useful in coinjection to make bioriented preforms.

14 Claims, No Drawings

COMPOSITION BASED ON AN ETHYLENE-VINYL ALCOHOL COPOLYMER AND ITS USE

CROSS REFERENCE TO RELATED APPLICATION

This application is related to a concurrently filed application entitled, "Composition Based On An Ethylene-Vinyl Alcohol Copolymer And Its Use" the inventors being, Denis Bertin, and Yves Germain, based on priority French application 99/00490 filed Jan. 19, 1999, said application being incorporated by reference herein.

The present invention relates to a composition based on an ethylene-vinyl alcohol copolymer (EVOH) and to its use.

EVOH copolymers provide a barrier to many gases and in particular to oxygen. Thus, many articles of food packaging comprise a layer consisting of an EVOH film.

SUMMARY OF THE INVENTION

The present invention relates more particularly to compositions comprising (the total being 100%):

50 to 98% by weight of an EVOH copolymer 1 to 50% by weight of a polyethylene (A)

1 to 15% by weight of a polymer (B) resulting from the reaction (i) of a copolymer (B1) of ethylene and of an unsaturated monomer X grafted or copolymerized with (ii) a polyamide (B2).

BACKGROUND OF THE INVENTION

In general, EVOH copolymers have various excellent properties such as oxygen impermeability, mechanical strength, etc., and find application, as they are, in many uses as films, sheets, materials for containers, textile fibres, etc. However, this copolymer gives rise to a variation in the thickness of the product in the moulding process for manufacturing a film or a sheet, with a consequent reduction in the marketability of the product, and, because of the shortcoming in stretchability and flexibility, gives rise to non-uniform drawing during deep drawing and other processes involving a stretching force, or pinholes during the use of the product, thus imposing serious limitations on its application as a raw material for packaging. The oxygen barrier of EVOH copolymers is greatly reduced when the relative humidity (RH) increases.

In order to overcome these drawbacks, it has been attempted to laminate a material made of an impermeable resin, such as a polyolefin film, on a sheet of EVOH copolymer or to improve the stretchability and flexibility of the moulding by incorporating a polyolefin into the EVOH copolymer.

Patent Application EP 820,381 describes blends of an EVOH copolymer and 5 to 60% by weight of a polar polymer chosen from ethylene-acrylic ester copolymers, ethylene-vinyl acetate copolymers and ethylene-acrylic ester-carboxylic acid anhydride or acrylic acid copolymers. These blends become very difficult to convert as soon as the amount of polar polymer exceeds 10% by weight. The dispersion of the polar copolymer is very poor, which in turn gives poor mechanical properties. If the amount of polar copolymer exceeds 40% by weight the blend is no longer an oxygen barrier.

Application EP 440,535 describes blends of 50 to 99.5% of an EVOH copolymer, 0.4 to 50% of a polyethylene having a relative density of between 0.900 and 0.940 and of the product of the reaction of a polyolefin grafted by an unsaturated carboxylic acid with a polyamide oligomer. The compositions of the present invention are an oxygen barrier and can be easily converted. Further advantages will be described in the following text.

DETAILED DESCRIPTION OF THE INVENTION

The invention will now be described in detail.

The EVOH copolymer is also called a saponified ethylene-vinyl acetate copolymer. The saponified ethylene-vinyl acetate copolymer to be employed according to the present invention is a copolymer having an ethylene content of 20 to 60 mol %, preferably 25 to 55 mol %, the degree of saponification of its vinyl acetate component not being less than 95 mol %.

With an ethylene content of less than 20 mol %, the property of oxygen impermeability under high humidity conditions is not as high as would be desired, whereas an ethylene content exceeding 60 mol % leads to reductions in the oxygen impermeability property, in the printability and in other physical properties. When the degree of saponification or of hydrolysis is less than 95 mol %, the oxygen impermeability property and the wet strength are sacrificed. Among these saponified copolymers, those which have melt flow indices in the range of 0.5 to 100 g/10 minutes are particularly useful.

It should be understood that this saponified copolymer may contain small amounts of other comonomer ingredients, including α-olefins, such as propylene, isobutene, α-octene, α-dodecene, α-octadecene, etc., unsaturated carboxylic acids or their salts, partial alkyl esters, complete alkyl esters, nitriles, amides and anhydrides of the said acids, and unsaturated sulphonic acids or their salts.

The oxygen permeability of the EVOH copolymer films, measured according to ASTM D 3985, is expressed in $cm^3$ of oxygen per $m^2$ for 24 hours for a pressure difference of 1 bar and a thickness of 25 µm. To simplify matters, the oxygen permeability is called $O_2GTR$ in the rest of the text.

$O_2GTR$ varies inversely proportionally to the thickness of the film.

An EVOH comprising 38 mol % of ethylene units has an $O_2GTR$ of 0.72 at 0% RH and 3.1 at 75% RH.

An EVOH comprising 29 mol % of ethylene units has an $O_2GTR$ of 0.1 at 0% RH and 1.41 at 75% RH. These grades are produced on an industrial scale and are commercially available.

One or the other of these grades is used in different thicknesses depending on the required barrier (type of product to be preserved, preservation time, etc.). The Applicant has discovered that the compositions of the invention, based on an EVOH copolymer containing 29 mol % ethylene, have, in film form, the same barrier properties as a film essentially consisting of an EVOH copolymer containing 38 mol % ethylene but can be very easily converted. This is because the EVOH copolymer, although it is a thermoplastic, is very rigid. Its flexural modulus is about 2000 MPa. The compositions of the invention have a flexural modulus of 1500 MPa as soon as the proportion of polyethylene (A) is at least 15% by weight.

The Applicant has also discovered that films consisting of the compositions of the invention are much less sensitive to moisture, that is to say that $O_2GTR$ at 75% RH is only 1.3 to 9 times the $O_2GTR$ at 0% RH and preferably 1.3 to 3.5 times, whereas this factor is 14 in the case of films made of EVOH containing 29% ethylene.

The invention is particularly suitable for EVOH copolymers having an ethylene content ranging from 25 to 45 mol % and MFIs (Melt Flow Index according to ASTM D 1238) ranging from 1.5 to 4 (g/10 minutes at 190° C./2.16 kg) and from 5 to 30 (g/10 minutes at 230° C./2.16 kg).

With regard to the polyethylene (A), this is chosen from ethylene homopolymers or ethylene copolymers.

By way of comonomers, mentioned may be made of:

alpha-olefins, advantageously those having from 3 to 30 carbon atoms.

Examples of alpha-olefins having 3 to 30 carbon atoms as possible comonomers comprise propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicocene, 1-dococene, 1-tetracocene, 1-hexacocene, 1-octacocene and 1-triacontene. These alpha-olefins may be used by themselves or as a mixture of two or more of them;

the esters of unsaturated carboxylic acids such as, for example, alkyl (meth)acrylates, the alkyls possibly having up to 24 carbon atoms.

Examples of alkyl acrylates or methacrylates are, especially, methyl methacrylate, ethyl acrylate, n-butyl acrylate, isobutyl acrylate and 2-ethylhexyl acrylate;

vinyl esters of saturated carboxylic acids such as, for example, vinyl acetate or vinyl propionate;

unsaturated epoxides.

Examples of unsaturated epoxides are especially:

aliphatic glycidyl esters and ethers, such as allyl glycidyl ether, vinyl glycidyl ether, glycidyl maleate, glycidyl itaconate, glycidyl acrylate and glycidyl methacrylate, and alicyclic glycidyl esters and ethers, such as 2-cyclohexen-1-yl glycidyl ether, diglycidyl cyclohexene-4,5-dicarboxylate, glycidyl cyclohexene-4-carboxylate, glycidyl 2-methyl-5-norbornene-2-carboxylate and di-glycidyl endo-cis-bicyclo[2.2.1]hept-5-ene-2,3-dicar-boxylate;

unsaturated carboxylic acids, their salts and their anhydrides.

Examples of anhydrides of an unsaturated dicarboxylic acid are, especially, maleic anhydride, itaconic anhydride, citraconic anhydride and tetrahydrophthalic anhydride;

dienes such as, for example, 1,4-hexadiene.

(A) may comprise several comonomers.

Advantageously, polymer (A), which may be a blend of several polymers, comprises at least 50% and preferably 75% (in moles) of ethylene. The density of (A) may be between 0.86 and 0.98 g/cm$^3$. The MFI (viscosity index at 190° C./2.16 kg) is advantageously between 1 and 1000 g/10 min.

By way of example of polymers (A), mention may be made of:

low-density polyethylene (LDPE);

high-density polyethylene (HDPE);

linear low-density polyethylene (LLDPE);

very low-density polyethylene (VLDPE);

polyethylene obtained by metallocene catalysis, that is to say polymers obtained by the copolymerization of ethylene and of an alpha-olefin such as propylene, butene, hexene or octene in the presence of a single-site catalyst generally consisting of a zirconium or titanium atom and of two alkyl cyclic molecules linked to the metal. More specifically, the metallocene catalysts are usually composed of two cyclopentadiene rings linked to the metal. These catalysts are frequently used with aluminoxanes as cocatalysts or activators, preferably methyl aluminoxane (MAO). Hafnium may also be used as the metal to which the cyclopentadiene is fixed. Other metallocenes may include transition metals of Groups IVA, VA and VIA. Metals from the series of lanthanides may also be used;

EPR (ethylene-propylene rubber) elastomers;

EPDM (ethylene-propylene-diene monomer) elastomers;

ethylene-alkyl (meth)acrylate copolymers possibly containing up to 60%, and preferably 2 to 40%, by weight of (meth)acrylate;

ethylene-alkyl (meth)acrylate-maleic anhydride copolymers obtained by copolymerization of the three monomers, the proportions of (meth)acrylate being as in the above copolymers, the amount of maleic anhydride being up to 10% and preferably 0.2 to 6% by weight;

ethylene-vinyl acetate-maleic anhydride copolymers obtained by copolymerization of the three monomers, the proportions being the same as in the previous copolymer.

Advantageously, (A) is chosen from copolymers of ethylene and alkyl (meth)acrylates. The alkyl may have up to 24 carbon atoms. Preferably, the (meth)acrylates are chosen from those mentioned above. Copolymers (A) advantageously comprise up to 40% by weight of (meth)acrylate and preferably 3 to 35%. Their MFI is advantageously between 0.1 and 50 (at 190° C./2.16 kg).

With regard to polymer (B), the starting point is the preparation of (B1) which is either a copolymer of ethylene and an unsaturated monomer X, or a polyethylene onto which an unsaturated monomer X is grafted. X is any unsaturated monomer that can be copolymerized with ethylene or grafted onto polyethylene and having a functional group that can react with a polyamide. This functional group may be a carboxylic acid, a dicarboxylic acid anhydride, an epoxide, etc.

By way of examples of monomer X, mention may be made of (meth)acrylic acid, maleic anhydride etc., unsaturated epoxides such as glycidyl (meth)acrylate. Advantageously, maleic anhydride is used. With regard to grafted polyethylenes, it is possible to graft X onto the polyethylenes that were described under (A). The grafting is an operation known per se. With regard to the copolymers of ethylene and the monomer X, that is to say those in which X is not grafted, it is advantageous to use ethylene-maleic anhydride and ethylene-alkyl (meth)acrylate-maleic anhydride copolymers. These copolymers comprise from 0.2 to 10% by weight of maleic anhydride and from 0 to 40% by weight of alkyl (meth)acrylate. Their MFI is between 1 and 50 (190° C./2.16 kg). The alkyl (meth)acrylates have already been described above in the case of polymer (A).

Polyamide (B2) should be understood to mean the products of the condensation:

of one or more amino acids, such as aminocaproic, 7-aminoheptanoic, 11-aminoundecanoic and 12-aminododecanoic acids or of one or more lactams, such as caprolactam, oenantholactam and lauryllactam;

of one or more salts or mixtures of diamines, such as hexamethylenediamine, dodecamethylenediamine, metaxylylenediamine, bis(p-aminocyclohexyl)methane and trimethylhexamethylenediamine with diacids, such as isophthalic, terephthalic, adipic, azeleic, suberic, sebacic and dodecanedicarboxylic acids;

or of mixtures of several monomers, thereby resulting in copolyamides.

Blends of polyamides may be used. Advantageously, PA-11, PA-12, the copolyamide containing nylon-6 units and nylon-12 units (PA-6/12) and the copolyamide based on caprolactam, hexamethylenediamine and adipic acid (PA-6/6,6) may be used.

(B2) is a polyamide or a polyamide oligomer. Polyamide oligomers are described in EP 342,066.

The polyamides B2 may have acid, amine or monoamine terminal groups. For the polyamide to have a monoamine terminal group, all that is required is to use a chain stopper of formula:

in which:

$R_1$ is hydrogen or a linear or branched alkyl group containing up to 20 carbon atoms;

$R_2$ is a group having up to 20 linear or branched, alkyl or alkenyl carbon atoms, a saturated or unsaturated cycloaliphatic radical, an aromatic radical or a combination of the above. The stopper may, for example, be laurylamine or oleylamine.

Advantageously, B2 is a PA-6, a PA-11 or a PA-12.

The proportion of B2 in B1+B2 by weight is advantageously between 0.1 and 60%.

The reaction of (B1) with (B2) preferably takes place in the molten state. (B1) and (B2) may, for example, be blended in an extruder at a temperature generally of between 230 and 250° C. The average residence time of the melt in the extruder may be between 10 seconds and 3 minutes, and preferably between 1 and 2 minutes.

According to a preferred embodiment of the invention, polyethylene (A) is an ethylene-alkyl (meth)acrylate copolymer and copolymer (B1) is an ethylene-alkyl (meth)acrylate-maleic anhydride copolymer. Preferably, the (meth)acrylates of (A) and (B1) are the same.

Particularly advantageous compositions comprise (the total being 100%):

55 to 98% EVOH copolymer
1 to 44% polyethylene (A)
1 to 10% polyethylene (B)

and preferably 55 to 75% EVOH copolymer
15 to 25% polyethylene (A)
5 to 15% polyethylene (B).

The compositions of the invention may be prepared by melt blending them in extruders (single-screw or twin-screw), BUSS kneaders, BRABENDER mixers and, in general, the usual devices for blending thermoplastics.

The compositions of the invention are particularly suitable for conversion by the usual techniques for thermoplastics. They may be made into film, for example by casting or by extrusion-blowing.

The compositions of the invention are useful as a barrier layer in multilayer packaging. They comprise, for example, a polyolefin layer, a binder, a layer of the compositions of the invention, a binder layer and a polyolefin layer.

They may be in the form of flexible packaging or of bottles or containers.

Such packaging is manufactured by coextrusion or by injection-blow moulding. The applicant has also discovered that the compositions of the invention exhibit a good adhesion to PET; thus in the previous packagings, bottles and containers it is not necessary to put a binder between the compositions and the PET. This property is usefull in coinjection to make preforms of bioriented bottles an flasks.

EXAMPLES

The following materials were used:

| | |
|---|---|
| EVOH E | ethylene-vinyl alcohol copolymer containing 38 mol % ethylene, having an MFI of 8 (210° C./2.16 kg), a melting point of 183° C., a crystallization temperature of 160° C. and a $T_g$ (glass transition temperature) of 61° C.; |
| EVOH D | ethylene-vinyl alcohol copolymer containing 29 mol % ethylene, having an MFI of 8 (210° C./2.16 kg), a melting point of 188° C., a crystallization temperature of 163° C. and a $T_g$ (glass transition temperature) of 62° C.; |
| LOTRYL 24MA005 | ethylene-methyl acrylate copolymer containing 24% by weight acrylate and having an MFI of 5 (190° C./2.16 kg) |
| POLYMER (B) | an ethylene-methyl acrylate-maleic anhydride copolymer (B1) containing 16% by weight acrylate and 4% by weight anhydride and having an MFI of 5 (190° C./2.16 kg) (Batch 3410), and then (B1) is reacted with various polyamides (B2); thus, 3 polymers (B) are obtained which are called B-G1, B-G2 and B-G3. |
| B-G1 | B2 is a monoaminated PA-6 oligomer having an MFI of 3 to 4. B2/(B1 + B2) = 45% by weight |
| B-G2 | B2 is a PA-11 having an MFI of 2 (235° C./2.16 kg) and a melting point of 183° C. (BESNO A) and B2/(B1 + B2) = 60% by weight |
| B-G3 | B2 is a PA-11 having an MFI of 1.3 (235° C./2.16 kg) and a melting point of 180° C. (KESNO A). B2/(B1 + B2) = 60% by weight. |

Films 25 μm in thickness are prepared by extrusion casting. The oxygen permeability was measured using an OXTRAN 2/20 apparatus.

The results are given in Table 1 (the proportions are by weight).

TABLE 1

| Examples | | 1 | 2 | 3 | 4 | 5 | 6 |
|---|---|---|---|---|---|---|---|
| EVOH E | | 100 | | | | | |
| EVOH D | | | 100 | 70 | 60 | 60 | 60 |
| LOTRYL 24MA005 | | | | 20 | 30 | 30 | 30 |
| B-G1 | | | | 10 | 10 | | |
| B-G2 | | | | | | 10 | |
| B-G3 | | | | | | | 10 |
| $O_2$GTR | (1) 0% RH, at 23° C. | 0.72 | 0.1 | 1.61 | 3.55 | 2.05 | 0.62 |
| | 75% RH, at 23° C. with 14 h of conditioning in water | 3.29 | | 6.79 | 13.05 | | |
| | (2) 75% RH, 23° C. | 3.1 | 1.41 | 5.6 | 11.30 | 2.84 | 2 |
| (2)/(1) ratio, 75% RH $O_2$GTR/0% RH $O_2$GTR | | 4 | 14.1 | 9 | 3 | 1.4 | 3.2 |

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding French application 99/00491, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A composition based on an ethylene-vinyl alcohol copolymer comprising:

50 to 98% by weight of an EVOH copolymer 1 to 50% by weight of an ethylene-alkyl (meth)acrylate copolymer (A)

1 to 15% by weight of a polymer (B) resulting from the reaction of:
    (i) a copolymer (B1) which is a copolymer of ethylene-alkyl (meth)acrylate copolymer, and an unsaturated monomer X,
    (ii) with a polymide (B2).

2. A composition according to claim 1, wherein the unsaturated monomer X is maleic anhydride.

3. A composition according to claim 2, wherein B2 is a PA-6, a PA-11 or a PA-12.

4. A composition according to claim 1, in which B1 is an ungrafted copolymer of ethylene, methyl acrylate and maleic anhydride.

5. A composition according to claim 1, wherein B2 is a PA-11 or a PA-12.

6. A composition according to claim 1, wherein said polyamide is PA-11.

7. A composition according to claim 6, wherein the content of the EVOH copolymer is about 60–70% by weight, the content of the ethylene-alkyl(meth)acrylate copolymer is about 20–30%, and the content of the reaction product of (B1) and (B2) is about 10%.

8. A composition according to claim 6, wherein the content of the EVOH copolymer is about 60% by weight, the content of the ethylene-alkyl(meth)acrylate copolymer is about 30%, and the content of the reaction product of (B1) and (B2) is about 10%.

9. A composition according to claim 1, wherein (A) is an ethylene-methyl acrylate copolymer.

10. A composition according to claim 1, wherein (A) is an ethylene-methyl methacrylate copolymer.

11. A composition according to claim 1, wherein the alkyl moiety of the alkyl (meth)acrylate in copolymer (B1) has up to 24 carbon atoms.

12. A composition according to claim 1, wherein the alkyl moeity of the alkyl (meth)acrylate in copolymer (A) has up to 24 carbon atoms.

13. A composition according to claim 1, wherein the unsaturated monomer X is (meth) acylic acid, maleic anhydride, or glycidyl (meth) acrylate.

14. A composition according to claim 1, wherein the copolymer (B1) comprises 0.2–10% by weight of maleic anhydride and no more than 40% by weight of alkyl (meth) acrylate.

* * * * *

UNITED STATES PATENT AND TRADEMARK OFFICE
CERTIFICATE OF CORRECTION

PATENT NO.    : 6,451,911 B1
DATED         : September 17, 2002
INVENTOR(S)   : Bertin et al.

It is certified that error appears in the above-identified patent and that said Letters Patent is hereby corrected as shown below:

Column 7,
Line 17, change "polymide" to -- polyamide --.
Line 26, before "PA-11", insert -- PA-6, a --.

Signed and Sealed this

Twentieth Day of July, 2004

JON W. DUDAS
*Acting Director of the United States Patent and Trademark Office*